Aug. 26, 1952     D. H. MONTGOMERY     2,608,414

COLLET PLUG

Filed Nov. 23, 1949

INVENTOR
DONALD H. MONTGOMERY
BY
Mitchell Bechert
ATTORNEYS.

Patented Aug. 26, 1952

2,608,414

UNITED STATES PATENT OFFICE 2,608,414

COLLET PLUG

Donald H. Montgomery, West Hartford, Conn., assignor to The New Britain Machine Company, New Britain, Conn., a corporation of Connecticut Application November 23, 1949, Serial No. 129,100

7 Claims. (Cl. 279—51)

My invention relates to a chuck and more particularly to a collet chuck incorporating means for preventing chips and other foreign matter from working back between jaws of a collet chuck. My invention is in the nature of an improvement over the arrangement disclosed in my Patent 2,012,826, issued August 27, 1935.

In said patent means are disclosed for substantially closing off the spaces between adjacent collet jaws so as to prevent chips from working back to the rear of the collet by way of the spaces between adjacent jaws. Such construction has been found extremely useful, but in applications in which substantial quantities of cutting oils or coolant fluids are played upon the work and the tool, such fluids may find their way rearwardly of the chip-barrier means. Fluid accumulations within the collet may then be sufficient to cause flow along the collet tube and to spill over at the rear into the works or gearing or other mechanism of the machine to which the collet is applied, thus diluting and otherwise impairing the lubricating efficiency of the lubricating means for such gearing.

It is, accordingly, an object of the invention to provide an improved collet means of the character indicated.

It is another object to provide an improved barrier means for a collet, whereby cutting oils or coolants may not be allowed to spill over into the works of the machine.

It is also an object to provide an improved collet construction, whereby such fluids as do accumulate rearwardly of the jaws may be quickly expelled before permitting any contaminating spill-over into the works of the machine.

It is a specific object to meet the above objects with a simple construction adaptable to existing collet chucks without modification of the chuck-jaw construction.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Briefly stated, the invention provides means whereby the centrifugal force developed in a rotating chuck and spindle may be utilized to expel cutting oils, coolants, and the like which may have found their way into the chuck past the jaws or otherwise, before such fluids may accumulate to the damage of the works of the machine. In the forms in which the invention is to be described, the chuck is of the so-called drawback-collet type, wherein sloping collet-jaw surfaces coact with a collet seat which flares outwardly toward the nose thereof. In order to prevent chips from working into the chuck past the jaws there may be provided a barrier means to keep the space between jaws effectively closed. To provide a means for expelling internally accumulated undesired fluids, I have provided a generally longitudinally extending channel or groove facing immediately adjacent the collet seat, whereby the centrifugal force developed by the rotating chuck may fling the undesired fluids against the collet seat; such fluids may then be thrown out the nose of the collet via the longitudinal groove or channel.

Figure 1:
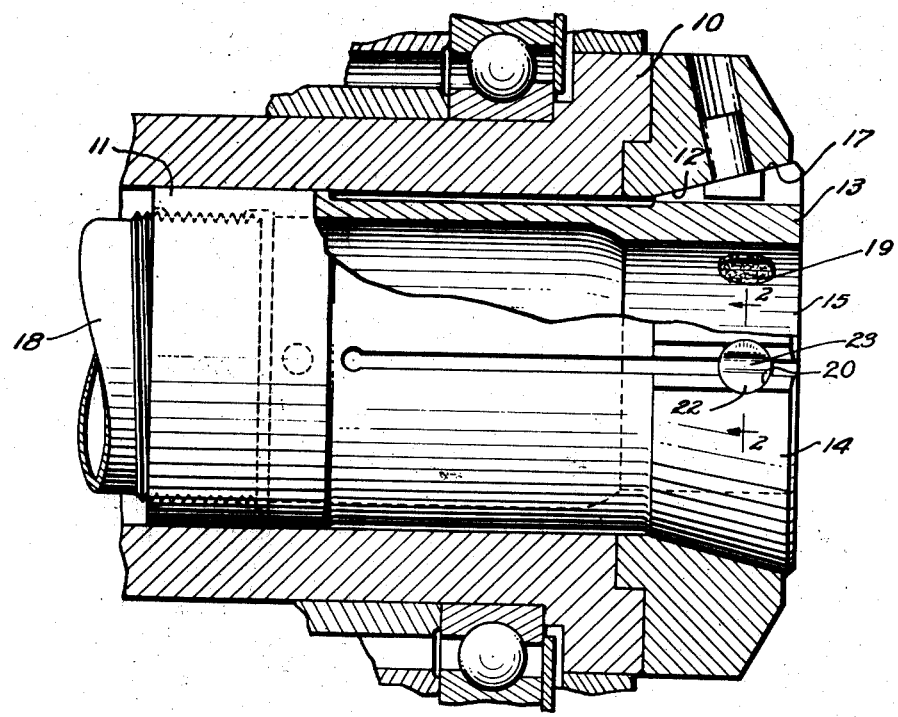
Fig. 1 is a fragmentary longitudinal view in partial section of a collet chuck incorporating features of the invention, the chuck being mounted in the nose of a rotatable spindle.
Figure 2:
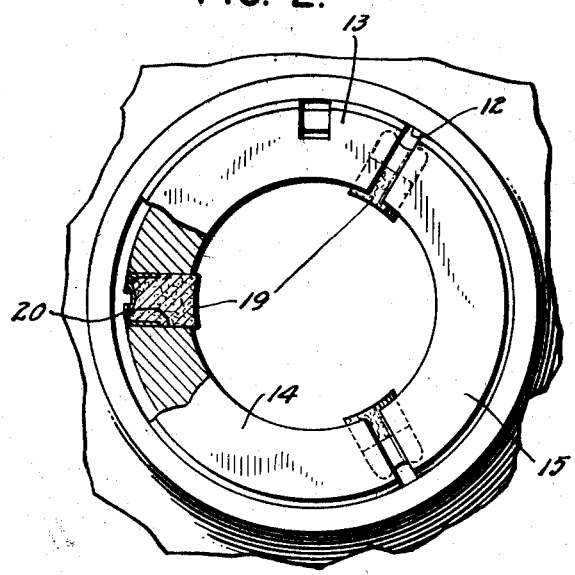
Fig. 2 is an end view partly in section in the plane 2—2 of Fig. 1.
Figures 3, 4:
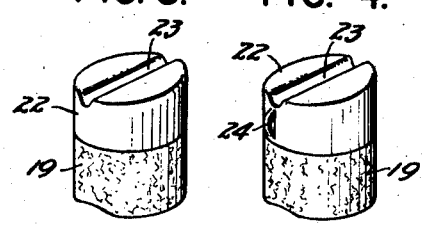
Fig. 3 is an enlarged perspective view of an element employed in the construction of Figs. 1 and 2.
Fig. 4 is another perspective view of an element representing a modification of the element shown in Fig. 3.

Referring to Figs. 1, 2, and 3 of the drawings, my invention is shown in application to a machine having a rotatable spindle 10 which is hollow so as to accommodate a drawback-collet type of collet 11. The bore of the spindle 10 at the nose end thereof may be provided with an outwardly flared tapering seat 12 for coaction with the jaws of the collet or chuck 11. In the form shown, the collet 11 is integrally formed with three spring jaws 13—14—15, each having internal work-gripping surfaces 16 and external seat-engaging surfaces 17, which may be sloped as shown in general conformity with the taper of the collet seat 12. Actuation of the collet 11 may be by means of a so-called drawback tube 18 shown threaded into the rear of the collet 11. To prevent entrance of chips and other solid foreign matter into the interior of the collet, suitable barrier means may be provided between jaws, and in the form shown I have employed plugs of resilient material, as at 19 between jaws 13—14. Such plugs may be held in place by radially extending recesses, as at 20, formed in adjacent faces of adjacent jaws, and I have found felt plugs 19 to be entirely suitable.

As noted above, the barrier means 19 may be entirely effective to keep chips from entering the collet, but it seems unavoidable that some cutting oils or coolants or the like may get past the barrier means or otherwise gain access to the interior of the collet. In accordance with the invention I have provided means for minimizing the undesirable effects of such accumulations, and in order not to involve any change in existing collet constructions, such means may be incorporated in the barrier plugs themselves. I have found that by suitably longitudinally grooving the outer surfaces of the plugs there may be provided one or more channels through which any internally accumulated fluids may be freely expelled through the collet nose under the action of centrifugal force. To assure that such channels may be continuously effective I prefer that they be defined by relatively non-resilient parts or members, and in the form shown in Figs. 1 to 3, I have applied longitudinally grooved cups 22 to the outer ends of the plugs 19. The cups 22 may be stampings of thin metal with the desired longitudinal grooves 23 provided in the cupped ends thereof.

In accordance with another feature of the invention, longitudinal alignment of grooves, such as the groove 23, may be assured and maintained by the use of finger means, as at 24 (Fig. 4), projecting longitudinally for guided engagement between adjacent faces of adjacent jaws, as will be clear.

Figure 5:
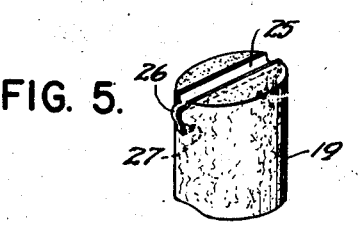
Fig. 5 is a still further modification.

In Fig. 5, I show a further modification in which the desired groove is provided by a channel member 25 sunk into the outer end of the plug 19. The channel member 25 may be formed at both ends with integral bent prong fingers 26 which may in function resemble the finger members 24 of Fig. 4. In order to retain the assembly of Fig. 5, the prong fingers 26 may include inwardly projecting tips 27 for self-retaining engagement with the resilient material of the plug 19.

It will be appreciated that I have described an improved chuck construction in which not only may chips be prevented from working within the chuck but in which cutting oils, coolants, or other fluids may be readily and automatically removed from the interior of the chuck before any damage to the works of the machine results. My improvement is simple in construction and in operation and requires no change-over difficulties in application to existing chucks or collets.

While I have described my invention in detail for the preferred forms shown, it will be understood that modifications may be made within the scope of the claims which follow.

I claim:

1. In a collet chuck including jaws extending into proximity with each other adjacent the gripping surfaces thereof, one of said jaws having a radial recess therein, and a barrier held in said recess and engaging said recess and the adjacent face of the next adjacent jaw, said barrier including a radially outer face to engage a collet seat, said outer face having a groove therein, said groove extending completely across said face and longitudinally with respect to the chuck axis, whereby said groove may provide a means of egress for fluids trapped in said chuck rearwardly of said barrier.

2. In a collet, jaws extending into proximity with each other adjacent the gripping surfaces thereof, one of said jaws having a radial recess therein, a radially extending barrier of flexible material engaging said recess and the adjacent face of the next adjacent jaw, and a relatively non-resilient member carried by said barrier at the radially outer end of said barrier and having an outwardly facing longitudinal recess therein, for the purpose described.

3. A device according to claim 2, in which said relatively non-resilient member is a metal cap fitting over the outer end of said barrier and having a longitudinal recess formed in the cupped part of said cap.

4. A device according to claim 2, in which said member includes a channel portion disposed at the radially outer end of said barrier and facing radially outwardly.

5. A device according to claim 2, in which said member includes longitudinally projecting guide finger means to fit between adjacent faces of adjacent jaws, whereby the longitudinal alignment of said barrier relatively to said jaws may be maintained regardless of the actuated or unactuated condition of the chuck.

6. As an article of manufacture, a barrier-member assembly to seal off the spaces between adjacent jaws of a collet chuck, said assembly including a barrier member of resilient compressible material and an end member of relatively non-compressible material, said end member having formed therein a recess extending generally transversely of the end of said barrier member, whereby when inserted in a chuck of the character indicated said recess may form a means of fluid egress, for the purpose described.

7. In a collet chuck, a plurality of jaws extending into proximity with each other adjacent the gripping surfaces thereof and including outer wedge surfaces for coaction with a collet seat having an outward flare opening at the nose end of the chuck, resilient barrier means held between adjacent jaws and extending substantially between the work-gripping surfaces and the seat-engaging surfaces thereof, said barrier means including a seat-engaging face at the radially outer end thereof, said face being recessed thereacross, the alignment of the recess in said face being such that a clear longitudinal passage is presented between said face recess and the collet seat whereby cutting oils or the like which have managed to enter said chuck past said barrier means may be centrifugally flung to the collet seat and out the nose end of the collet via the recess so as not to accumulate and spill over into the internal gearing or other mechanism of the machine to which said collet chuck may be applied.

DONALD H. MONTGOMERY.

REFERENCES CITED

The following references are of record in the file of this patent:

UNITED STATES PATENTS

| Number | Name | Date |
|---|---|---|
| 2,277,816 | Brown | Mar. 31, 1942 |

FOREIGN PATENTS

| Number | Country | Date |
|---|---|---|
| 482,766 | England | Apr. 5, 1938 |